W. BAGNALL.
Cultivating Plows.

No. 144,247. Patented Nov. 4, 1873.

Witnesses:

Inventor:
W. Bagnall
Per Munn & Co
Attorneys.

UNITED STATES PATENT OFFICE.

WILLIAM BAGNALL, OF OTSEGO, OHIO.

IMPROVEMENT IN CULTIVATING-PLOWS.

Specification forming part of Letters Patent No. 144,247, dated November 4, 1873; application filed August 9, 1873.

*To all whom it may concern:*

Figure 1:
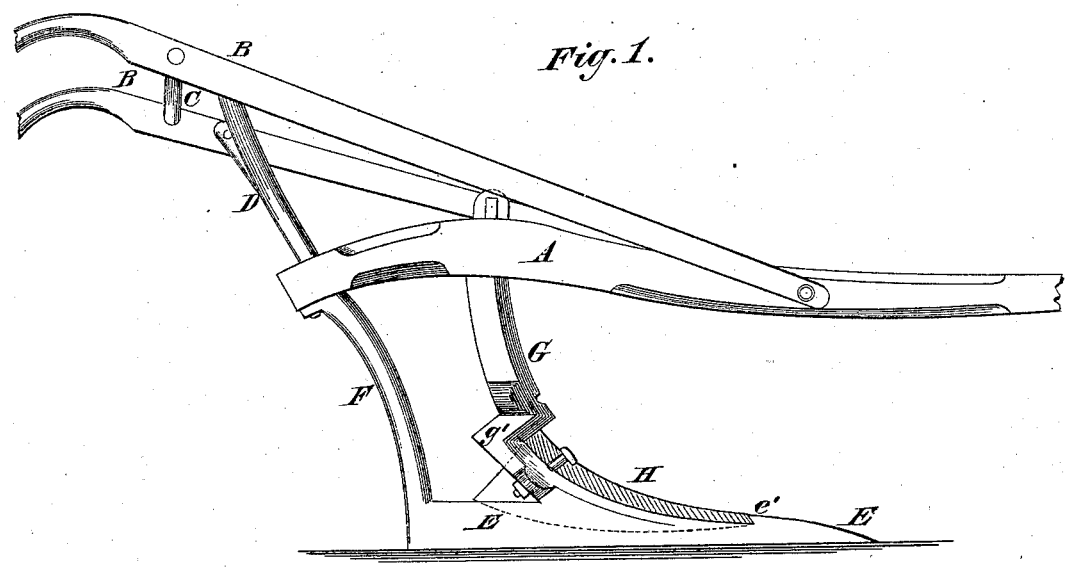
Figure 2:
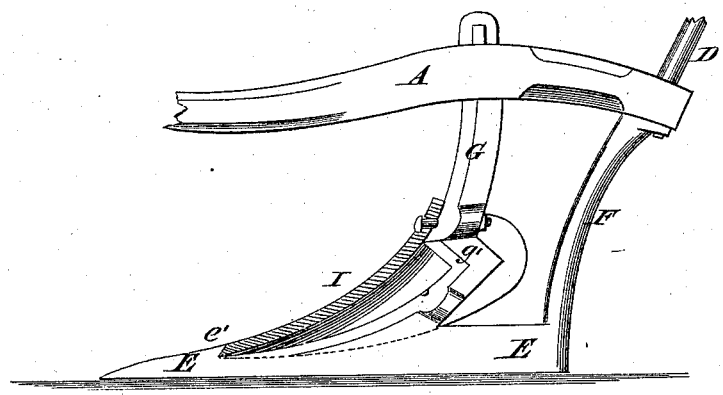

Be it known that I, WILLIAM BAGNALL, of Otsego, in the county of Muskingum and State of Ohio, have invented a new and useful Improvement in Cultivating-Plow, of which the following is a specification:

Figure 1 is a side view of my improved plow, partly in section through the shovel. Fig. 2 represents the other side of the plow, a larger shovel being shown in section.

Similar letters of reference indicate corresponding parts.

The invention will first be fully described, and then clearly pointed out in the claim.

A is the plow-beam. B are the handles, the forward ends of which are attached to the opposite sides of the middle part of the beam A, and the rear parts of which are connected and held in proper relative position by a round, C. The handles B are supported at the proper height by an upright, D, the lower end of which is secured to the rear end of the beam A; and its upper part is forked or branched, and the ends of its forks or branches are secured to the handles B. E is the foot or bar of the plow, to the rear end of which is attached, or upon it is formed, the lower end of a standard, F, which curves slightly to the rearward; and its upper end is secured to the rear end of the beam A. To the foot E, a little in the rear of its middle point, is secured, or upon it is formed, the lower end of the forward standard, G, the upper end of which is secured to the beam A. In the upper side of the forward part of the foot E is formed a shoulder, $e'$, for the forward end of the plow-plate to abut against. From the shoulder $e'$ the upper side of the foot E curves slightly upward, said curve being continued upon the lower part of the standard G to form a seat for the smaller or weed-cutting plow H, as shown in Fig. 1. The standard G is made with an offset or forward projection, $g'$, to form a seat for the upper part of the larger or dirt-throwing plow I, as shown in Fig. 2, the lower end of said plow I fitting and resting against the shoulder $e'$ of the foot E. The plows H and I are secured to their seats upon the standard G by bolts, as shown in Figs. 1 and 2. The parts of the standard weakened by the bolt-holes are strengthened by projections formed upon its sides opposite said holes, as shown in Figs. 1 and 2. The plow H is thus low, so as to pass beneath the soil, cutting off the weeds and grass, but leaving the surface of the ground almost entirely undisturbed, and throwing no soil around the plants. The plow I, on the other hand, from the greater height of its rear end, and the greater flare of its wings, throws the soil around the plants. By this construction, the plows H I being made wide, a single plow is enabled to do the work of two or more small plows.

Having thus described my invention, I claim as new and desire to secure by Letters Patent—

The standard G $g'$, constructed as described, and combined with the foot E, as and for the purpose specified.

WILLIAM BAGNALL.

Witnesses:
JOHN M. JOHNSON,
ROBERT BROWNFIELD.